UNITED STATES PATENT OFFICE.

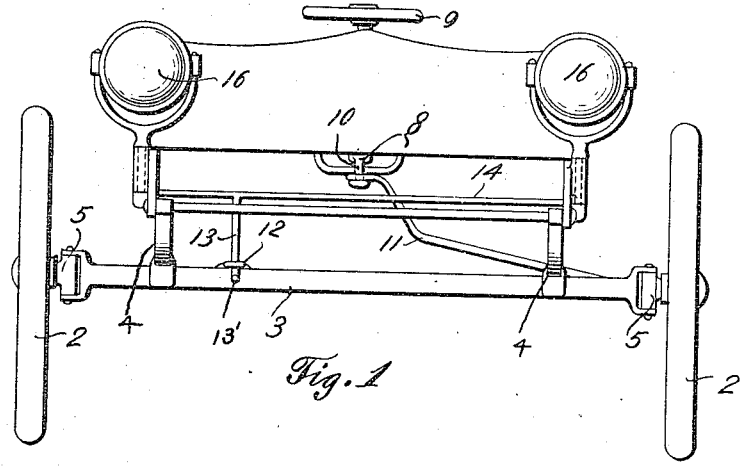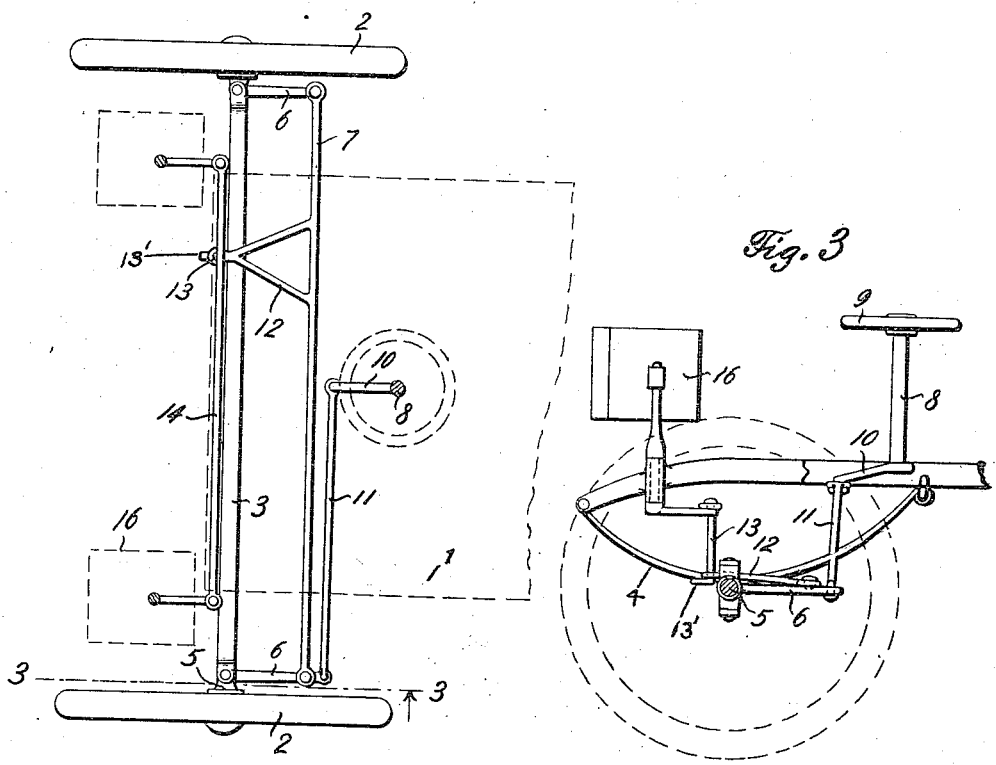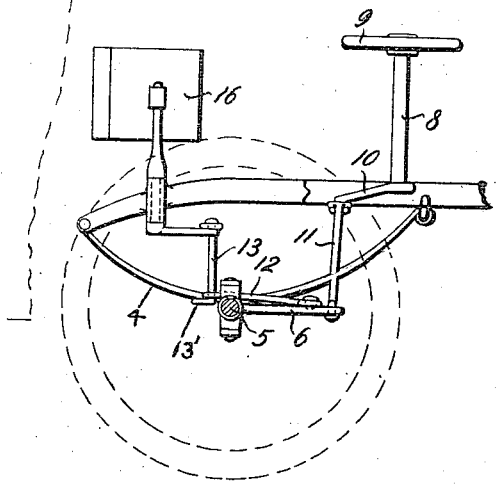

FRANK JACKSON, OF MOUNTAIN HOME, IDAHO, ASSIGNOR OF ONE-HALF TO C. B. FARADAY, OF MOUNTAIN HOME, IDAHO.

DIRIGIBLE SUPPORT FOR LAMPS.

983,234.      Specification of Letters Patent.      Patented Jan. 31, 1911.

Application filed May 10, 1910. Serial No. 560,516.

*To all whom it may concern:*

Be it known that I, FRANK JACKSON, a citizen of the United States, residing at Mountain Home, in the county of Elmore and State of Idaho, have invented certain new and useful Improvements in Dirigible Supports for Lamps, of which the following is a specification.

This invention relates to automobiles and comprises certain mechanism associated with a vehicle for turning the lamps at the front end thereof in the same direction as the front wheels are turned, when the latter are actuated by the steering means which is of the ordinary type.

The object of the invention is to provide improvements in any devices heretofore patented and which are designed for the purpose above set forth.

In the accompanying drawings, Figure 1 is a front elevation of a motor vehicle showing the invention applied thereto; Fig. 2 is a top plan view showing the parts of the invention, and the steering mechanism associated directly therewith, in full lines, the body of the vehicle being shown in dotted lines; Fig. 3 is a section taken about on the line 3—3 of Fig. 2 and showing more clearly the connecting means between the operating bars of the lamps and the steering mechanism, whereby the wheels and the lamps are simultaneously moved.

Throughout the following detail description and on the several figures of the drawings, similar parts are referred to by like reference characters.

In carrying out the present invention, it is contemplated that the means comprising the same may be employed with a conventional type of steering mechanism for the front wheels of the vehicle, and it is to be understood that the invention may be used in connection with vehicles of almost any type whether motor driven or not.

Referring to the drawings, the numeral 1 denotes the vehicle body, 2 the front or steering wheels thereof, 3 the front supporting axle, and 4 the springs by which the body 1 is supported on the axle 3. Steering wheels 2 are connected to the axle 3 by the usual stub axles 5, and projecting rearwardly from the axles 5 are the steering arms 6, the latter being connected together by a bar 7. Suitably mounted on the vehicle body is a steering shaft 8 provided with the hand wheel 9 at its upper end, and the lower end of said shaft has an arm 10, a connecting rod 11 connecting said arm 10 with one of the steering arms 6. Intermediate of its ends, the operating bar 7 connecting the stub axles 5 is provided with a forwardly extending bracket 12 provided with an opening at its front end through which passes a downwardly extending member 13 which is carried by a lamp operating bar 14. The bar 14 is horizontally arranged and connected at its ends with the rearwardly projecting arms of the lamps 16, the latter being mounted for movement about vertical axes and supported on the frame of the vehicle body.

It will be apparent that when the steering wheel 9 is turned, the operating bar 7 will be shifted horizontally to move the front wheels 2 of the vehicle in the customary manner. By reason of the connection of the bracket 12 with the depending arm or member 13 of the bar 14, the shifting of the bar 7 will simultaneously shift the lamp operating bar 14 in the same direction and effect the desired turning movement of the lamps so that the light rays projected therefrom will always be in the direction in which the vehicle is going. Since the vehicle body 1 is yieldably supported on the axle 3 by springs, it is necessary that the connection between the lamps and the operating bar 7 shall accommodate for relative vertical movement of the two bars 7 and 14, and hence the provision of the depending arm 13 that passes through the opening in the bracket 12, thereby affording practically a sliding connection between the parts 7 and 14 so that the lamps may be readily operated from the bars 7 irrespective of the position of the bar 14 as it moves up and down with the vehicle body in passing over obstacles causing resilient movement of the springs 4. A lateral projection 13' at the lower end of the depending arm 13 prevents disconnection of the bracket 12, said bracket extending over and normally resting on the front axle 3.

Having thus described the invention, what is claimed as new is:—

In combination, a vehicle body, a front supporting axle, steering wheels connected with said axle, steering mechanism connected with said wheels including an operating bar shiftable horizontally, lamps on the vehicle body, an operating bar connecting the same and movable with the vehicle body relatively to the operating bar connected to the wheels, a bracket projecting laterally from the wheel shifting bar, an arm depending from the lamp operating bar and passing through said bracket to afford sliding connection therewith, and a projection at the lower end of said depending arm preventing disconnection of the same from the bracket.

In testimony whereof I affix my signature in presence of two witnesses.

FRANK JACKSON.

Witnesses:
ALVA A. WHITE,
F. E. AUSTIN.